United States Patent [19]

Parks

[11] 3,860,869

[45] Jan. 14, 1975

[54] DEVICE FOR MEASURING VEHICLE SPEED BY MEASURING DISTURBANCE OF THE EARTH'S MAGNETIC FIELD

[75] Inventor: Jack G. Parks, Troy, Mich.

[73] Assignee: The United States of America as represented by the Secretary of the Army, Washington, D.C.

[22] Filed: Jan. 29, 1974

[21] Appl. No.: 437,565

[52] U.S. Cl. ................................ 324/163, 324/179
[51] Int. Cl. ............................................ G01p 15/00
[58] Field of Search .......... 324/160, 163, 164, 165, 324/179, 34 PS, 34 D

[56] References Cited
UNITED STATES PATENTS
3,656,059  4/1972  Overstreet .......................... 324/179

Primary Examiner—Michael J. Lynch
Attorney, Agent, or Firm—John F. Schmidt; John E. McRae; Peter A. Taucher

[57] ABSTRACT

The disclosure shows a vehicle speed measuring device using a magnetometer located a known distance from the vehicle path. Vehicle movement disturbs the earth's magnetic field, and the vertical component of the response, measured by the magnetometer, is fed through electronic circuitry which measures the elapsed time between the maximum signal thus generated and half of the maximum and measures that time against the distance covered, computing the vehicle speed and registering the speed on a visual readout.

8 Claims, 1 Drawing Figure

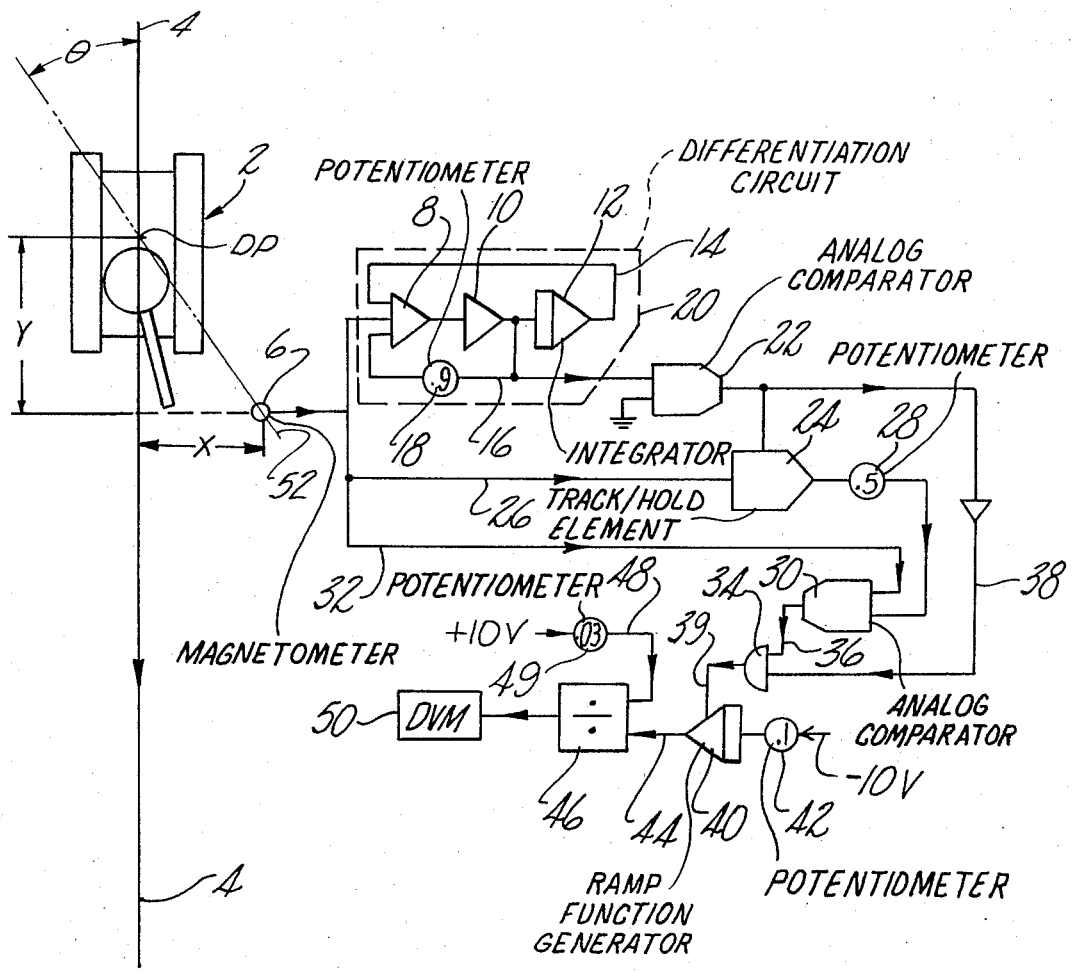

DEVICE FOR MEASURING VEHICLE SPEED BY MEASURING DISTURBANCE OF THE EARTH'S MAGNETIC FIELD

The invention described herein may be manufactured, used, and licensed by or for the Government for governmental purposes without payment to me of any royalty thereon.

BACKGROUND OF THE INVENTION

1. Field of the Invention

This invention relates to techniques of gathering intelligence about the activity of hostile forces, especially to means for determining the speed of enemy combat vehicles such as tanks, armored cars, personnel carriers, with the purpose of interdiction of movement of such vehicles by feeding the intelligence into fire control equipment, or for incorporation into intelligence reports, or for similar purposes.

2. Description of the Prior Art

Since the object is to obtain intelligence about the speed of movement of enemy equipment, it is self-evident that the intelligence gathering function is either remote from the enemy activity, or is done without enemy knowledge, and preferably both. Prior means for remotely measuring vehicle speeds have used pneumatic reaction devices or Doppler shift radar. A major problem with pneumatic reaction means is the difficulty of camouflage against visual detection; also, such devices entail excessive wear on contacts, and tend to be plagued with false triggering problems when measuring the speed of multiwheeled trucks and trailers. Doppler shift radar requires highly sophisticated instrumentation, and is subject to operating errors under adverse atmospheric conditions.

SUMMARY OF THE INVENTION

This invention utilizes the disturbance induced in the earth's magnetic field (the vertical component) by the movement of the vehicle in the geomagnetic field. A magnetometer which detects that disturbance puts out a signal which becomes the input to an analog circuit of which the output is a voltage which is proportional to vehicle speed.

It is accordingly an object of the invention to provide a vehicle speed detection device capable of operating at a point remote from the vehicle's path to generate an electrical signal usable with appropriate electronic devices to translate the signal into intelligence meaningful to a qualified human observer.

DESCRIPTION OF THE DRAWING

The single FIGURE of the drawing is a diagram of a vehicle moving along a given path, and of the circuitry making up the present invention.

DETAILED DESCRIPTION OF A PREFERRED EMBODIMENT

A military vehicle is shown at 2 proceeding along a road shown by its centerline 4. A magnetometer 6 capable of measuring the vertical component of the geomagnetic field anomaly generated by vehicle movement is placed at some point away from the road 4 at a distance $x$ from the closest point of approach of the vehicle.

The analog output of magnetometer 6 is fed into an operational amplifier 8, of which the output is supplied to a second amplifier 10, from which the signal is the input to integrator 12. The integrator output signal is supplied by way of a loop 14 back into amplifier 8, and a feedback loop 16 from amplifier 10 to amplifier 8 includes a grounded potentiometer 18 set at 0.9, which is provided to adjust the behavior of the differentiation circuit 20 consisting of elements 8, 10, 12 and 18 interconnected as shown.

Differentiation circuit 20 is the solution to the differential equation $$(1\text{-}A)\, dy'/dt + y' = dB_z/dt$$

wherein $B_z$ is the vertical axis magnetometer response, measured in gauss;

A is the value of the potentiometer setting; and $y'$ is the output of the circuit (i.e., the output of amplifier 10).

Other circuits can be constructed to approximate the indicated differentiation operation; see e.g., *operational amplifiers*, by Graeme, Tobey, and Hudsman, Library of Congress Catalog Card No. 74-163297, pages 218 and 219.

The output of differentiation circuit 20 is applied to an analog comparator 22 which has characteristics such that its output is logic one as long as $$dB_z/dt > 0,$$

and is logic zero when $$dB_z/dt \leq 0.$$

The output of comparator 22 is used to control a track/hold element 24 which monitors the magnetometer signal input by way of line 26. When comparator 22 has a logic output of one (i.e., $B_z$ is approaching its maximum value), element 24 tracks the $B_z$ signal and inverts the polarity. When $$dB_z/dt = 0,$$

the logic output of comparator 22 becomes zero, and then element 24 holds the (negative) maximum value of the magnetometer signal.

A grounded potentiometer 28 takes the output of element 24 and multiplies it by 0.50, and the resulting signal is the input to a second analog comparator 30. Comparator 30 has another input as indicated by the connection or line 32, and this second input is the magnetometer signal. The output of comparator 30 is fed into an AND gate 34 via line 36. Gate 34 has another input connection via line 38 to receive the logic complementary output of comparator 22.

As noted above, track/hold element 24 inverts the polarity of its analog input signal, so that the output of element 28, after $dB_z/dt$ has become negative, is $-\frac{1}{2}(B_z)_{max}$. Since the second input to comparator 30 is the magnetometer signal $B_z$, the total input signal of comparator 30 is $B_z - \frac{1}{2}(B_z)_{max}$; when the total input signal of comparator 30 is greater than zero voltage its output is logic one, and when its input is less than or equal to zero voltage, comparator 30 has a logic zero output.

AND gate 34 has an output signal control connection 39 to a ramp function generator 40, which is an integrator with a constant input. As here shown, a minus 10 volt input to a 0.1 potentiometer 42 becomes a minus one volt constant input to ramp generator 40. Generator 40 provides as its output a voltage proportional to the time required for $B_z$ to vary from its maximum value to one-half its maximum value (i.e., $t_{1/2}$), with an inverted (positive) polarity.

The output signal of generator 40 becomes, through line 44, the denominator input to a division circuit element 46, having through line 48 and a potentiometer 49 a numerator input which is a voltage proportional to $0.766x$. The output of element 46 goes to any suitable intelligence indicator or readout, here shown as a digital voltmeter 50.

OPERATION

Reference now is to combat vehicle 2 in the drawing and its movement from the top of the drawing toward the bottom along the path marked 4, in the course of which movement it passes magnetometer 6 at a distance of $x$. When such a vehicle passes through the earth's magnetic field, the vertical component of the magnetometer response may be shown by a magnetic dipole model $$B_z = M_z/(x^2 + y^2)^{3/2} \qquad 1.$$

in which
- $B_z$ = the vertical axis magnetometer response (measured in gauss);
- $M_z$ = the vertical component of the magnetic dipole;
- $x$ = the distance between the magnetometer and the point of closest approach (CPA) of the vehicle (in meters); and
- $y$ = the distance in meters of the vehicle from the CPA measured along path 4.

The value of $B_z$ reaches its maximum when $y = 0$, at which point $$(B_z)_{max} = M_z/x^3 . \qquad 2.$$

The object is to determine the distance $y$ at the time that $B_z$ is half of its maximum. If equation (1) is solved for $y$ and if then half of the value of equation (2) is substituted for $B_z$, the distance $y$ at the time that $B_z$ is half of its maximum value comes to $$y_{1/2} = 0.766x \qquad 3.$$

It is advantageous to express the above relationships in polar coordinates, wherein $\theta$ is defined as the angle between path 4 and a line 52 drawn from the vehicle to magnetometer 6. When this is done, equation (1) becomes $$B_z = M_z \sin^3\theta/x^3 \text{ and} \qquad 4$$

the equivalent of equation (3) becomes $$\theta_{1/2} = \pi/2 \pm 37.47°. \qquad 5$$

As will be understood by those skilled in the art, the angle $\theta_{1/2}$, namely equation (5), is the value for the angle $\theta$ at the point in path 4 when the vehicle causes magnetometer 6 to generate an output signal which is half of its maximum signal. For purposes of illustration, vehicle 2 is shown as having a dipole location at point DP, which point may be taken for computing distances, angles, and the like.

It should be pointed out that the indicated setting of potentiometer 18 is 0.9, and values in excess of 0.9 cause circuit instability.

The output of differentiation circuit 20 is an analog signal which becomes the input to comparator 22. As long as $dB_z/dt > 0$, comparator 22 has a logic one output. When $$dB_z/dt \leq 0,$$

the output of comparator 22 is logic zero. The logic output of comparator 22 is used to control track/hold element 24, which monitors the signal of magnetometer 6 fed to track/hold element 24 by the connection 26.

As long as the output of comparator 22 is logic one, element 24 tracks the $B_z$ signal of magnetometer 6. When $B_z$ becomes a maximum, $dB_z/dt$ passes through zero, whereupon the comparator 22 logic output becomes zero, and track/hold element 24 holds the value of $B_z$ at its maximum. Potentiometer 28 divides that maximum by two and supplies the signal as an input, at a negative polarity, to comparator 30, which has another input of plus $B_z$ via connection 32.

The logic output of comparator 30 and the logic complementary output of comparator 4 then serve as inputs to AND gate 34.

In the light of the foregoing, a typical cycle can now be summarized as follows: as long as angle $\theta$ is less than $\pi/2$, comparator 22 is in the logic one state, track/hold element 24 has an analog output of $B_z/2$ because of potentiometer 28, and comparator 30 has an output of logic one since $B_z - B_z/2 > 0$. With this situation, AND gate 34 has an output of logic zero.

When $\theta$ is between $\pi/2$ and $\pi/2 + 37.47°$, the output of comparator 22 is logic zero, comparator 30 and AND gate 34 have an output of logic one, and the output of track/hold element 24 (through potentiometer 28) is half of the maximum of $B_z$. AND gate 34 is turned off when $\theta \geq \pi/2 + 34.47°$ because the input to comparator 30 is $B_z - (B_z)_{max}/2 < 0$ and the output of comparator 30 is logic zero. The foregoing conditions may be tabulated as follows

| angle $\theta$ | omp 22 | track/hold 24 | omp 30 | gate 34 |
|---|---|---|---|---|
| $0 \leq \theta < 90°$ | one | $B_z$ | one | zero |
| $90° \leq \theta < 127.47°$ | zero | $(B_z)_{max}$ | one | one |
| $\theta > 127.47°$ | zero | $(B_z)_{max}$ | zero | zero |

The output of gate 34 is used to control ramp generator 40 which, with proper scaling, supplies a voltage equal in magnitude to the time that gate 34 has an output of logic one -- i.e., $t_{1/2}$. The analog output of ramp generator 40 is the denominator of a ratio of which the numerator is the scaled value of $y$. The final answer, $v$ for vehicle speed, appears on digital voltmeter 50.

I wish it to be understood that I do not desire to be limited to the exact details of construction shown and described, for obvious modifications will occur to a person skilled in the art.

What is claimed is:

1. A device to measure the velocity of a vehicle along a given path comprising:

a. a single magnetometer positioned at a predetermined distance from the path for detecting the vehicle-induced disturbance of the geomagnetic field; and
b. an electronic circuit connected to receive the output of the magnetometer and having
  i. means for continuously monitoring the magnetometer's output, for sensing the maximum output, and for calculating the occurrence of two predetermined amplitudes of the magnetometer's output on the basis of said maximum,
  ii. means for determining the elapsed time between the two amplitudes,
  iii. means for relating said two predetermined amplitudes to the distance the vehicle moves along the path between the two amplitudes,
  iv. means for correlating said elapsed time data and said output amplitudes in relation to the distance moved along the path to produce an output proportional to vehicle speed, and
  v. means receiving said proportional output and presenting it in terms of speed intelligence.

2. A device as in claim 1, wherein the magnetometer is one which responds to the vertical component of said geomagnetic field.

3. A device as in claim 2, wherein the first-named means senses the maximum output of the magnetometer and also the output which is half of the maximum.

4. A device as in claim 3, wherein the electronic circuit includes a differentiation circuit connected to receive the magnetometer output signal, the differentiation circuit output being an analog signal.

5. A device as in claim 1, wherein the first-named means senses the maximum output of the magnetometer and also the output which is half of the maximum.

6. A device as in claim 5, wherein the electronic circuit includes a differentiation circuit connected to receive the magnetometer output signal, the differentiation circuit output being an analog signal.

7. A device as in claim 1, wherein the electronic circuit includes a differentiation circuit connected to receive the magnetometer output signal, the differentiation circuit output being an analog signal.

8. A device as in claim 7, wherein the magnetometer is one which responds to the vertical component of said geomagnetic field.

* * * * *